United States Patent
Kasturi et al.

(10) Patent No.: US 9,774,211 B2
(45) Date of Patent: Sep. 26, 2017

(54) VOLTAGE REGULATION IN WIRELESS POWER

(71) Applicant: Intel Corporation, Santa Clara, CA (US)

(72) Inventors: Sreenivas Kasturi, Hillsboro, OR (US); Songnan Yang, San Jose, CA (US); Jonathan Rosenfeld, Portland, OR (US); Isaac Sever, Beaverton, OR (US); Trent D. Whitten, Hillsboro, OR (US); Shahar Porat, Geva Carmel (IL)

(73) Assignee: Intel Corporation, Santa Clara, CA (US)

( * ) Notice: Subject to any disclaimer, the term of this patent is extended or adjusted under 35 U.S.C. 154(b) by 173 days.

(21) Appl. No.: 14/712,144

(22) Filed: May 14, 2015

(65) Prior Publication Data

US 2016/0336757 A1 Nov. 17, 2016

(51) Int. Cl.
| | |
|---|---|
| *H02J 7/00* | (2006.01) |
| *H02J 1/10* | (2006.01) |
| *H02J 5/00* | (2016.01) |
| *H01F 27/16* | (2006.01) |
| *B60L 1/00* | (2006.01) |
| *B60L 3/00* | (2006.01) |
| *H04B 3/00* | (2006.01) |
| *H04B 15/00* | (2006.01) |
| *H02J 7/02* | (2016.01) |
| *H02J 50/12* | (2016.01) |
| *H02J 7/16* | (2006.01) |

(52) U.S. Cl.
CPC ............ *H02J 7/025* (2013.01); *H02J 50/12* (2016.02); *B60L 1/00* (2013.01); *B60L 3/00* (2013.01); *H01F 27/16* (2013.01); *H02J 1/10* (2013.01); *H02J 5/005* (2013.01); *H02J 7/16* (2013.01); *H04B 3/00* (2013.01); *H04B 15/00* (2013.01)

(58) Field of Classification Search
CPC .... H02J 7/00; H02J 7/0025; H02J 7/16; H02J 1/10; H02J 5/005; H02J 50/12; H01F 27/16; B60L 1/00; B60L 3/00; H04B 3/00; H04B 15/00
USPC .......... 320/108, 135, 143; 336/55; 307/10.1, 307/44, 90
See application file for complete search history.

(56) References Cited

U.S. PATENT DOCUMENTS

| | | | | |
|---|---|---|---|---|
| 5,642,267 | A * | 6/1997 | Brkovic | G05F 1/613 323/224 |
| 6,705,441 | B1 | 3/2004 | Boys et al. | |
| 9,123,467 | B2 * | 9/2015 | Wu | H02M 3/33576 |
| 9,379,629 | B2 * | 6/2016 | Chandrasekaran | H01F 27/28 |
| 2007/0249398 | A1 * | 10/2007 | Watanabe | G06K 7/0008 455/558 |

(Continued)

OTHER PUBLICATIONS

Partial European Search Report for EP Patent Application 16164774 dated Sep. 7, 2016, 1 page.

*Primary Examiner* — Phallaka Kik
(74) *Attorney, Agent, or Firm* — International IP Law Group, P.L.L.C.

(57) ABSTRACT

Techniques for voltage regulation in a system, method, and apparatus are described herein. An apparatus for voltage regulation in a wireless power receiver may include a rectifier having an output voltage. The apparatus may also include voltage compensation logic including at least one capacitor to reduce voltage variation of the output voltage from the rectifier.

23 Claims, 8 Drawing Sheets

(56) References Cited

U.S. PATENT DOCUMENTS

| | | | | |
|---|---|---|---|---|
| 2012/0069611 A1* | 3/2012 | Yang | ............... | H02M 1/4225 |
| | | | | 363/44 |
| 2012/0242159 A1* | 9/2012 | Lou | ............... | H03H 7/40 |
| | | | | 307/104 |
| 2014/0191568 A1* | 7/2014 | Partovi | ............... | H02J 7/025 |
| | | | | 307/9.1 |
| 2014/0265614 A1* | 9/2014 | Kim | ............... | H01F 38/14 |
| | | | | 307/104 |
| 2014/0306545 A1 | 10/2014 | Robertson et al. | | |
| 2014/0339906 A1 | 11/2014 | Miyamoto et al. | | |
| 2015/0287544 A1* | 10/2015 | Irazoqui | ............... | H01G 11/36 |
| | | | | 361/502 |
| 2015/0303709 A1* | 10/2015 | Nalbant | ............... | H02J 5/005 |
| | | | | 307/104 |
| 2015/0372493 A1* | 12/2015 | Sankar | ............... | H02J 5/005 |
| | | | | 307/104 |
| 2016/0056640 A1* | 2/2016 | Mao | ............... | H02J 50/10 |
| | | | | 307/104 |
| 2016/0056664 A1* | 2/2016 | Partovi | ............... | H02J 7/025 |
| | | | | 307/104 |

* cited by examiner

VOLTAGE REGULATION IN WIRELESS POWER

TECHNICAL FIELD

This disclosure relates generally to techniques for wireless charging. Specifically, this disclosure relates to regulation of voltage in wireless power systems.

BACKGROUND ART

A basic wireless charging system may include a wireless power transmitter unit (PTU) and a wireless power receiving unit (PRU). For example, a PTU may include a transmit (Tx) coil, and a PRU may include receive (Rx) coil. Magnetic resonance wireless charging may employ a magnetic coupling between the Tx coil and the Rx coil. In some cases, wireless power received may vary causing issues with efficiency in wireless charging systems. In some cases, variations of voltage may violate wireless charging standard specifications.

The same numbers are used throughout the disclosure and the figures to reference like components and features. Numbers in the 100 series refer to features originally found in FIG. 1; numbers in the 200 series refer to features originally found in FIG. 2; and so on.

DETAILED DESCRIPTION

The present disclosure relates generally to techniques for wireless charging. Specifically, the techniques described herein include a wireless power rectifier and voltage compensation logic to reduce voltage variation of output voltage from the rectifier. As discussed above, voltage variations may generate inefficiencies in wireless charging. For example, spatial freedom of placement of a device under charge having a receiver (Rx) coil may result in a potentially large rectified receiver voltage (Vrect) variation. Variations in Vrect may constrain designs by requiring stringent field uniformity in some cases.

Voltage compensation logic, as referred to herein, includes one or more electric circuit components, modules, or integrated components configured to reduce variation in voltage. Specifically, voltage compensation logic may be configured to reduce variation of Vrect at a wireless charging component such as a wireless charging receiving coil. As discussed in more detail below, voltage compensation logic may include one or more of capacitors in a feedback loop configured to reduce variations in Vrect, amplifiers, resistors, and the like.

In some cases, large variation on Vrect may present different design challenges, as discussed below in regard to FIG. 2-FIG. 4. One design challenge may include delivering load modulation signals within a predefined range. For example, in some cases power (Prect) of load modulation may be required to be between 0.5 watts (W) and 1.1 W. Therefore, in some cases, the voltage compensation logic and techniques discussed herein may generate a compensated current source (I_compensate) that may be used to toggle load modulation signaling on Vrect (for any Vrect, for example Vrect=4Volts–20Volts), wherein 0.5W<Prect=Vrect*I_compensate<1.1W, as discussed in more detail below in regard to FIGS. 5-7.

In some cases, the techniques discussed herein may be implemented using a wireless charging standard protocol, such as the specification provided by Alliance For Wireless Power (A4WP) version 1.2.1, May 07, 2014. A wireless power Rx coil may be a component in a power receiving unit (PRU), while a wireless power transmission (Tx) coil may be a component in a power transmitting unit (PTU), as discussed in more detail below. However, the techniques described herein may be implemented using any other wireless charging standard protocol where applicable.

Figure 1:
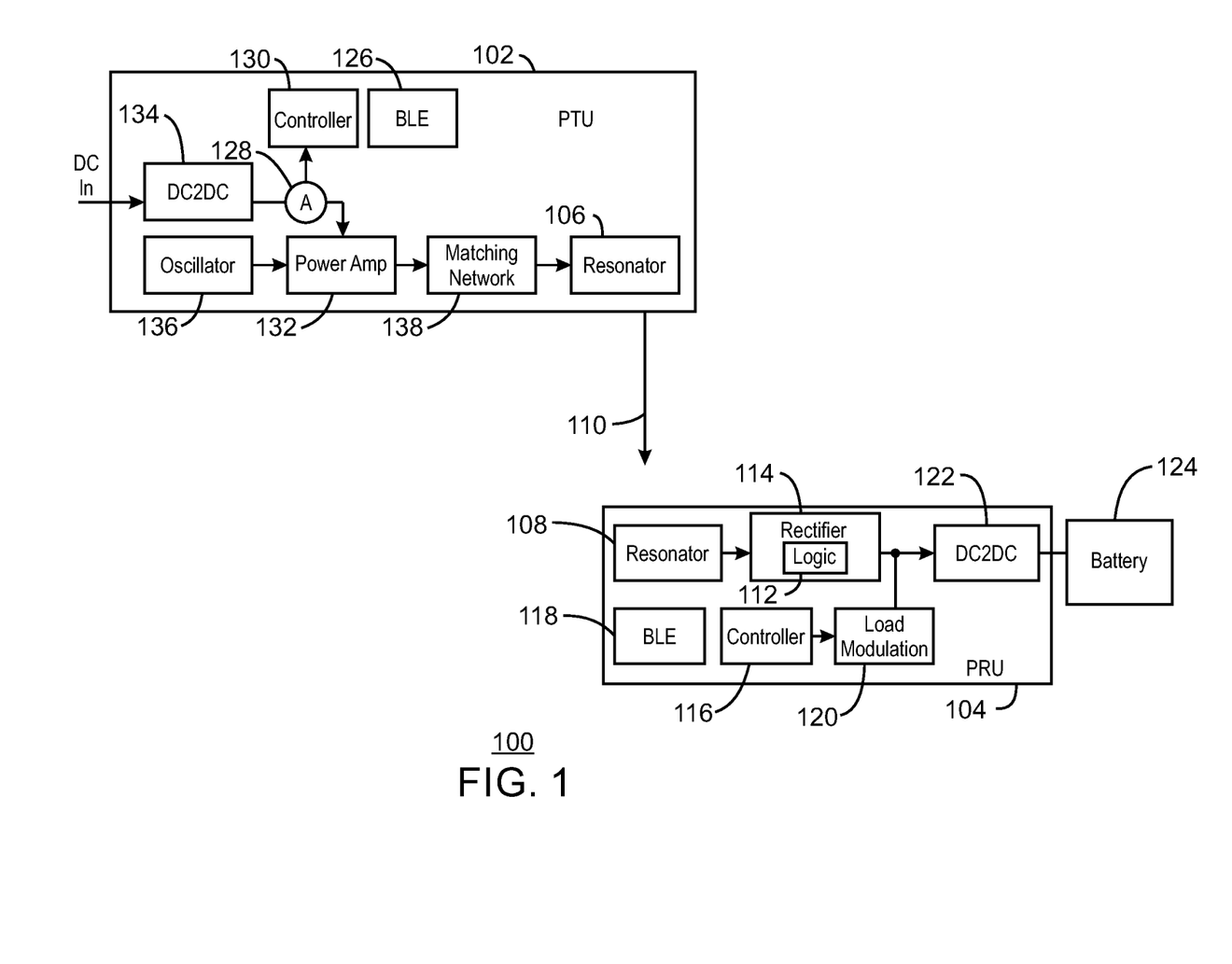
FIG. 1 is block diagram of a PTU to provide power to a PRU, wherein the includes logic configured to reduce variations in voltage.

FIG. 1 is block diagram of a PTU to provide power to a PRU, wherein a magnetic component protrudes from the PTU. A PTU 102 may couple to a PRU 104 via magnetic inductive coupling between resonators 106, and 108, as indicated by the arrow 110. The resonator 106 may be referred to herein as a Tx coil 106 of the PTU 102. The resonator 108 may be referred to herein as an Rx coil 108 of the PRU 104.

As illustrated in FIG. 1, the PRU 104 may include logic 112. The logic 112 may be referred to herein as voltage compensation logic 112. The voltage compensation logic 112 may be configured as an integrated component of a rectifier 114, as a separate component of the rectifier 114, or any combination thereof. In any case, the voltage compensation logic 112 may be configured to reduce variations in Vrect. In other words, the voltage compensation logic 112 may be configured to reduce variations in rectified voltage output by the rectifier 114. The voltage compensation logic 112 may be composed of one or more components, such as electronic circuit components, as discussed in more detail below in regard to FIG. 2 and FIG. 5. For example, the voltage compensation logic 112 may be implemented as a current source to introduce limits on Vrect variation. As another example, the voltage compensation logic 112 may be implemented using a voltage controlled capacitor in parallel with the Rx coil 108. Additional details are discussed in more detail below in regard to FIG. 2 and FIG. 5, as well as throughout the present description, Figures, and claims.

In FIG. 1, the PRU 104 may include a controller 116 configured to detect current received at the Rx coil 108 resulting from an inductive coupling between the Tx coil 106 and the Rx coil 108. In some cases, the controller 114 may be configured to initiate load modulations to communicate a wireless data broadcast.

In some cases, the wireless broadcast may be carried out by a wireless data transmission component such as a Bluetooth Low Energy (BLE) module 118. In some cases, the wireless data transmission component may be integrated as operations of the controller 116, a load modulation circuit 120, a direct current to direct current (DC2DC) converter 122, or any combination thereof, wherein the data transmission may be indicated by patterns in the load modulation.

As illustrated in FIG. 1, the DC2DC converter 122 provides a DC output to a battery 124, or another current/power consuming component. The DC2DC converter 122 may convert DC received as a result of the inductive coupling of the Tx coil 106, the Rx coil 108, and the rectifier 114.

The PTU 102 may include a BLE module 126 configured to communicate with the BLE module 118. The PTU 102 may also include a current sensor 128, a controller 130, a power amplifier 132, a DC2DC converter 134, an oscillator 136, and a matching network 138. The current sensor 128 may be an ampere meter, a volt meter, or any other sensor configured to sense load variations occurring due to inductive coupling between the PTU 102 and another object, such as the PRU 104. The current sensor 128 may provide an indication of load change to the controller 130 of the PTU 102. The controller 130 may power on the power amplifier 132 configured to receive direct current (DC) from the DC2DC converter 134, and to amplify and oscillate the current. An oscillator 136 may oscillate the power provided at a given frequency and a matching network 138 may be used to match the amplified oscillation provided to the resonator 106 of the PTU 102.

The block diagram of FIG. 1 is not intended to indicate that the PTU 102 and/or the PRU 104 are to include all of the components shown in FIG. 1. Further, the PTU 102 and/or the PRU 104 may include any number of additional components not shown in FIG. 1, depending on the details of the specific implementation.

Figure 2:
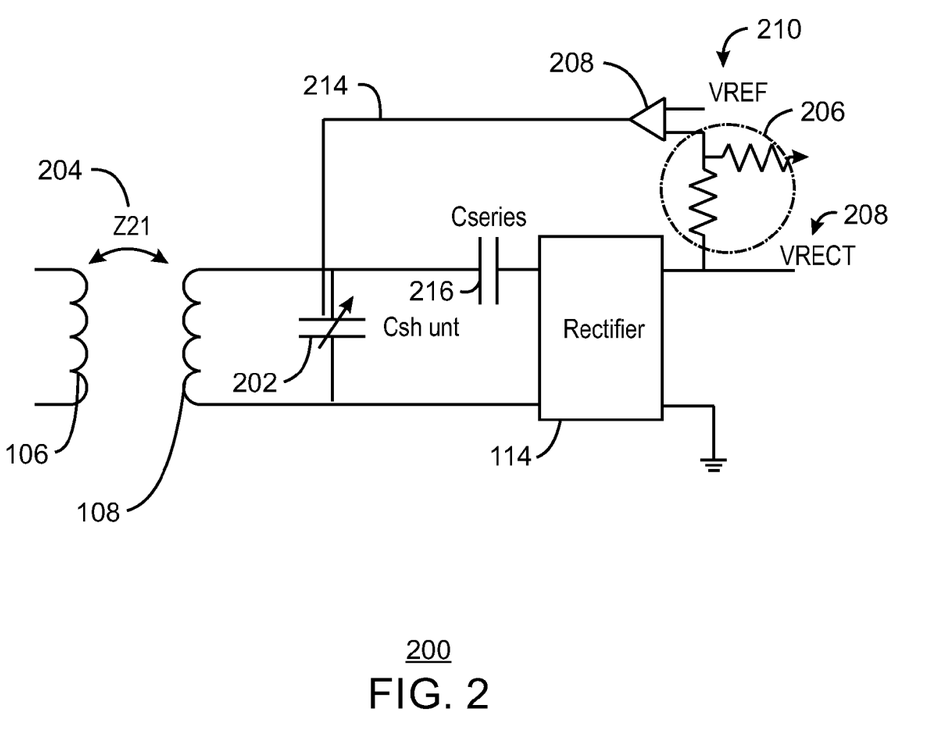
FIG. 2 is an illustration of logic configured to reduce variations of rectifier voltage.

FIG. 2 is an illustration of logic configured to reduce variations of rectifier voltage. The logic, generally indicated at 200, is one implementation of the voltage compensation logic 112 of FIG. 1. In FIG. 2 a voltage controlled capacitor 202 may be coupled in parallel to an Rx coil, such as the Rx coil 108 of FIG. 1. The Rx coil 108 may be configured to be inductively coupled to a Tx coil, such as the Tx coil 106 of FIG. 1, as illustrated by the coupling $Z_{21}$ 204 of FIG. 2. A rectifier, such as the rectifier 114 of FIG. 1, may output a voltage indicated by Vrect 208 in FIG. 2.

A voltage divider, indicated at the dashed circle 206, may be configured to sample Vrect 208 and to reduce Vrect 208 to a fraction so that Vrect 208 is comparable to a reference voltage (Vref) 210. A difference amplifier 212 may be configured to detect a difference between Vref 210 and the divided voltage level of Vrect 208. A bias voltage indicated at 214 may be adjusted based on the detected difference. The bias voltage 214 is proportional to the difference between the Vref 210 and the Vrect 208. The bias voltage 214 may drive the voltage controlled capacitor 202 to change the capacitance of the voltage controlled capacitor 202.

The voltage divider 206 and Vref 210 may be chosen such that as Vrect 208 increases above a predefined value for the Vref 210, the bias voltage 214 supplied to the voltage controlled capacitor 202 increases. An increase in voltage supplied by the bias voltage 214 to the voltage controlled capacitor 202 may reduce the capacitance of the voltage controlled capacitor 202, and therefore a reduction of output voltage, such as the Vrect 208 may result. The voltage controlled capacitor 202 may thereby introduce a continuous limit to voltage values occurring at Vrect 208. The limitation of the voltage range of Vrect 208 may enable compliance with standards specifications for wireless charging, such as limitations to voltage ranges implemented by A4WP discussed above during Long Beacon Extension Requests (LEBRs) wherein a PRU, such as the PRU 104 may be limited to load variations of 0.5 watts and 1.1 watts as discussed in more detail below in regard to FIG. 5.

In some cases, the voltage controlled capacitor 202 may be capacitor bank comprising a plurality of capacitors having discrete capacitance value capabilities. In this scenario, an increase of Vrect 208 may trigger appropriate values in the capacitor bank to reduce net capacitance of the capacitor bank, thereby reducing voltage including Vrect 208.

It may be useful to note variations of the implementation of FIG. 2. For example, the difference amplifier 212 may be replaced with a comparator that provides input to a microcontroller, or an interrupt driven adjustable voltage source configured to adjust capacitance as appropriate. A combination of fixed and variable capacitors may also be used to tailor a capacitive range of a variable capacitor to a larger total capacitance adjustment.

As illustrated in FIG. 1, a capacitor 216 may also be included in the logic 200 wherein the capacitor 216 is in series with the Rx coil 108. In some cases, the capacitor 216 may be a tunable capacitor, such as the voltage controlled capacitor 202. In this scenario, a finer granularity of voltage regulation may be approached than if the capacitor 216 was not tunable. The configuration of the capacitor 216 and the voltage controlled capacitor 202 may be based on an operating set voltage at a minimum $Z_{21}$ 204 inductive coupling.

Figure 3:
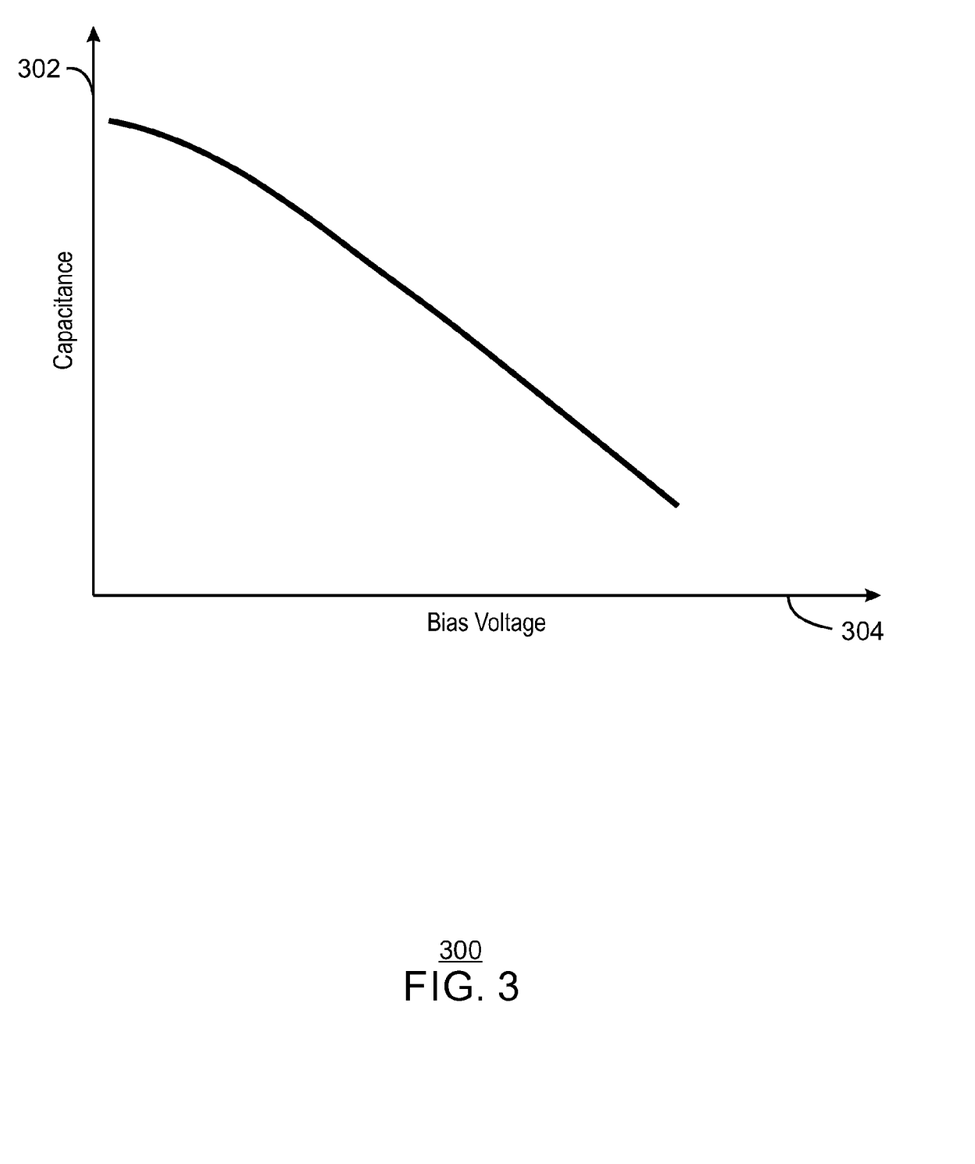
FIG. 3 is a graph illustrating changes in voltage in terms of capacitance.

FIG. 3 is a graph illustrating changes in voltage in terms of capacitance. As discussed above, changes in capacitance may result in changes in voltage. As illustrated in FIG. 3, as capacitance increases at 302, a bias voltage decreases at 304. Further, as capacitance decreases at 302, voltage increases at 304. The techniques described herein include capacitance-based voltage compensation logic, according to one aspect.

Figure 4:
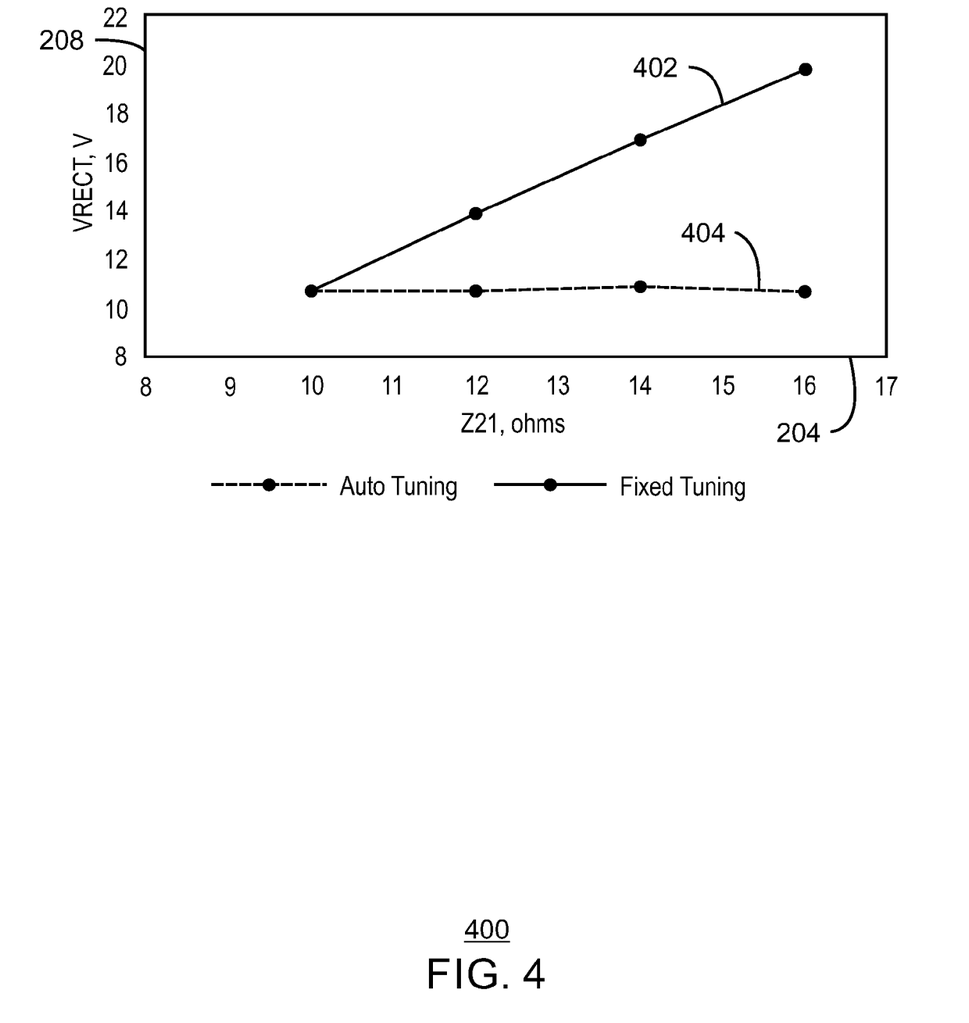
FIG. 4 is a graph illustrating changes in rectifier voltage in terms of resistance in a magnetic coupling between a wireless transmitter and a wireless receiver.

FIG. 4 is a graph illustrating changes in rectifier voltage in terms of magnetic coupling (represented by $Z_{21}$ in ohms on the horizontal axis) between a wireless transmitter and a wireless receiver. As discussed above, when variation of coupling occurs, such as variation of $Z_{21}$ 204 of FIG. 2, a rectifier voltage variation in Vrect 208 may result. As indicated at line 402, the voltage of Vrect 208 varies widely as the coupling in $Z_{21}$ 204 also varies. However, when the capacitance is tunable, as $Z_{21}$ increases the Vrect 208 may be maintained at the same level.

Figure 5:
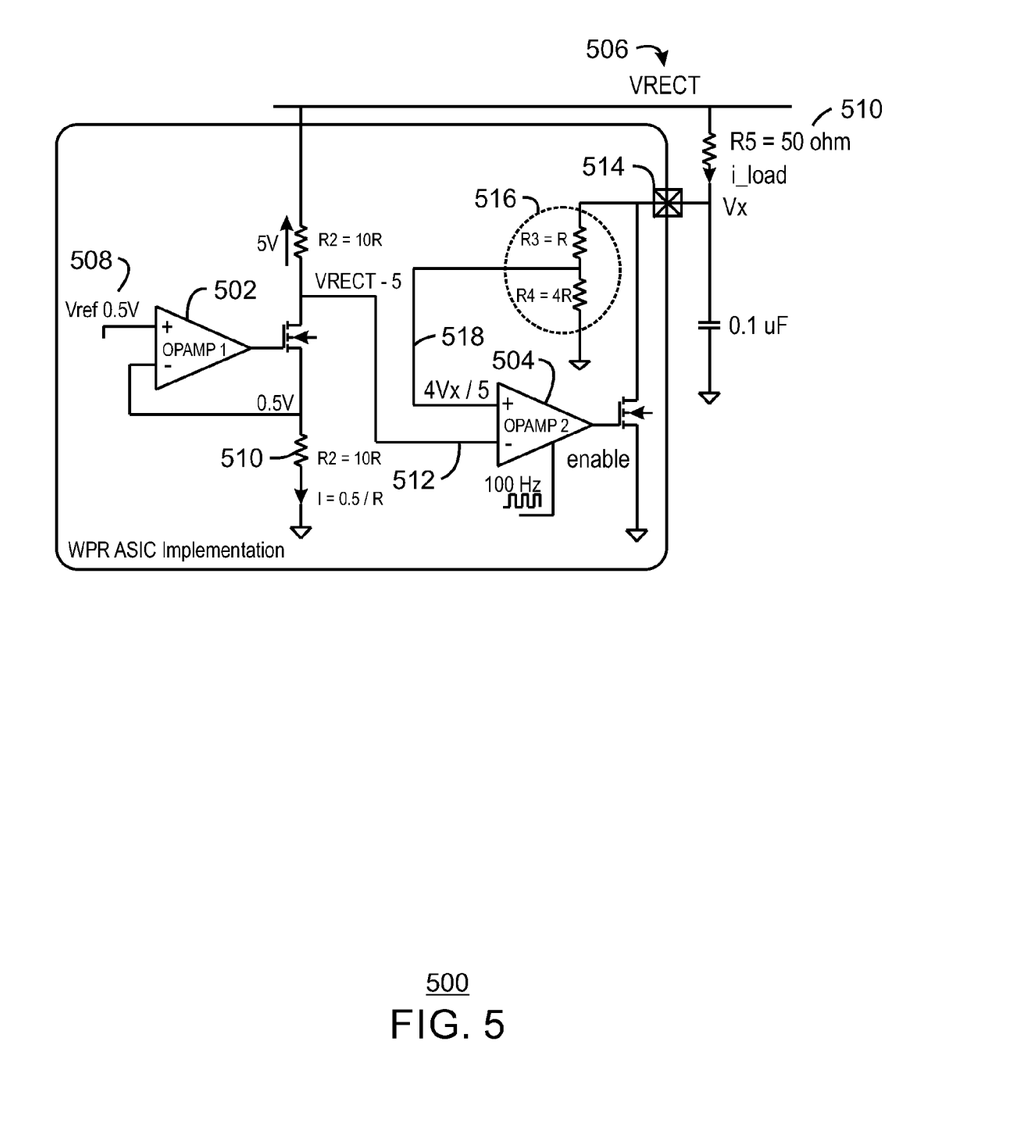
FIG. 5 is an illustration of logic configured to reduce variations of rectifier power using a compensated current source that may change as a function of rectified voltage.

FIG. 5 is an illustration of logic configured to reduce variations of rectifier power using a compensated current source that may be changed as a function of Vrect. As discussed above, in some cases, one design challenge may include delivering load modulation signals within a predefined range. For example, in some cases power (Prect) of load modulation may be required to be between 0.5 watts (W) and 1.1 W. Therefore, in some cases, the voltage compensation logic and techniques discussed herein may generate a compensated current source (I_compensate) that may be used to toggle load modulation signaling on Vrect (for any Vrect, for example Vrect=4 Volts–20 Volts), wherein 0.5W<Prect=Vrect*I_compensate<1.1W, as discussed in more detail below in regard to FIGS. 5-7.

The logic, generally indicated at 500, is one implementation of the voltage compensation logic 112 of FIG. 1. The logic 500 may be referred to herein as current source-based voltage compensation logic 500. In FIG. 5, the logic 500 includes a first amplifier 502, a second amplifier 504, communicatively coupled to a rectified voltage (Vrect) 506. The first amplifier 502 may be configured to receive an input reference voltage (Vref) 508. The Vrect 506 and Vref 508 may be similar to the Vrect 208 and the Vref 210 of FIG. 2, respectively. The example logic 500 may be implemented alone, or in any combination with the logic 200 of FIG. 2.

As illustrated in FIG. 5, the first amplifier 502 may be configured to drive a current "I" on a first resistor (R1) 510 having a resistance "R". In the example illustrated in FIG. 5, a Vref 508 is equal to 5 volts (V), and the current I may be equal to 0.5 Volts/R. The current I may generate a voltage of Vrect−5V on a negative input of the second amplifier 504, as indicated at 512. The logic 500 may include an external pin 514. Voltage on the external pin may be indicated by "Vx." The voltage Vx may be determined by Equation 1 below:

$$VR5 = Vrect - Vx \qquad \text{Eq. 1}$$

In Eq. 1, "VR5" represents the difference in voltage between the rectified voltage Vrect and the voltage Vx at the external pin 514 of the logic 500. The behavior of Vx may be a function of an output signal of the second amplifier 504. A voltage divider, generally indicated at 516, may generate a fraction (4Vx/5) of the voltage Vx on a positive input to the second amplifier, as indicated at 518. The second amplifier 504 may be configured to equalize the voltage on the positive line at 518 and the voltage on the negative line 512 as illustrated in Equation 2 below:

$$4Vx/5 = Vrect - 5 \qquad \text{Eq. 2}$$

Solving Eq. 1 for Vx is illustrated in Equation 3 below:

$$Vx = 1.25 \times (Vrect - 5) \qquad \text{Eq. 3}$$

In the example illustrated in FIG. 5, placing resistor R5 equal to 50 Ohm, a current load $I_{load}$ will result, as illustrated in Equation 4 below:

$$\begin{aligned} I_{Load} &= \frac{Vrect - Vx}{R5} \\ &= \frac{Vrect - Vx}{50} \\ &= \frac{Vrect - 1.25 \times Vrect + 6.25}{50} \\ &= .125 - .005 \times Vrect \end{aligned} \qquad \text{Eq. 3}$$

Although FIG. 5 implements specific values such as 50 ohm on R5, Vrect-5 on input line 512, 4 Vx/5 on input line 518, a Vref of 0.5 V, and the like, any values may be used to produce a desired limit on Vrect 506. The techniques described herein implement current source-based voltage compensation logic 500. In some cases, the current source-based compensation logic 500 may be used to restrict Vrect during certain modes of operation.

For example, the A4WP standards specification includes an initialization flow wherein a PTU, such as the PTU 102 of FIG. 1, sends a periodic power beacon (long beacon) that may occur for 100 milliseconds. During the long beacon, a PRU, such as the PRU 104 of FIG. 1, may respond with a BLE advertisement signal, or a Long Beacon Extension Request (LBER) signal based on a load modulation signature. The LBER signal may include two modulation pulses at 100 hertz (Hz). During a positive edge of the load modulation pulse, the PRU 104 may be required to sink at least 0.5 Watts of power, and not more than 1.1 Watts. Therefore, the techniques described herein may be useful for limiting voltage, and therefore power, during such load modulation processes.

Figure 6:
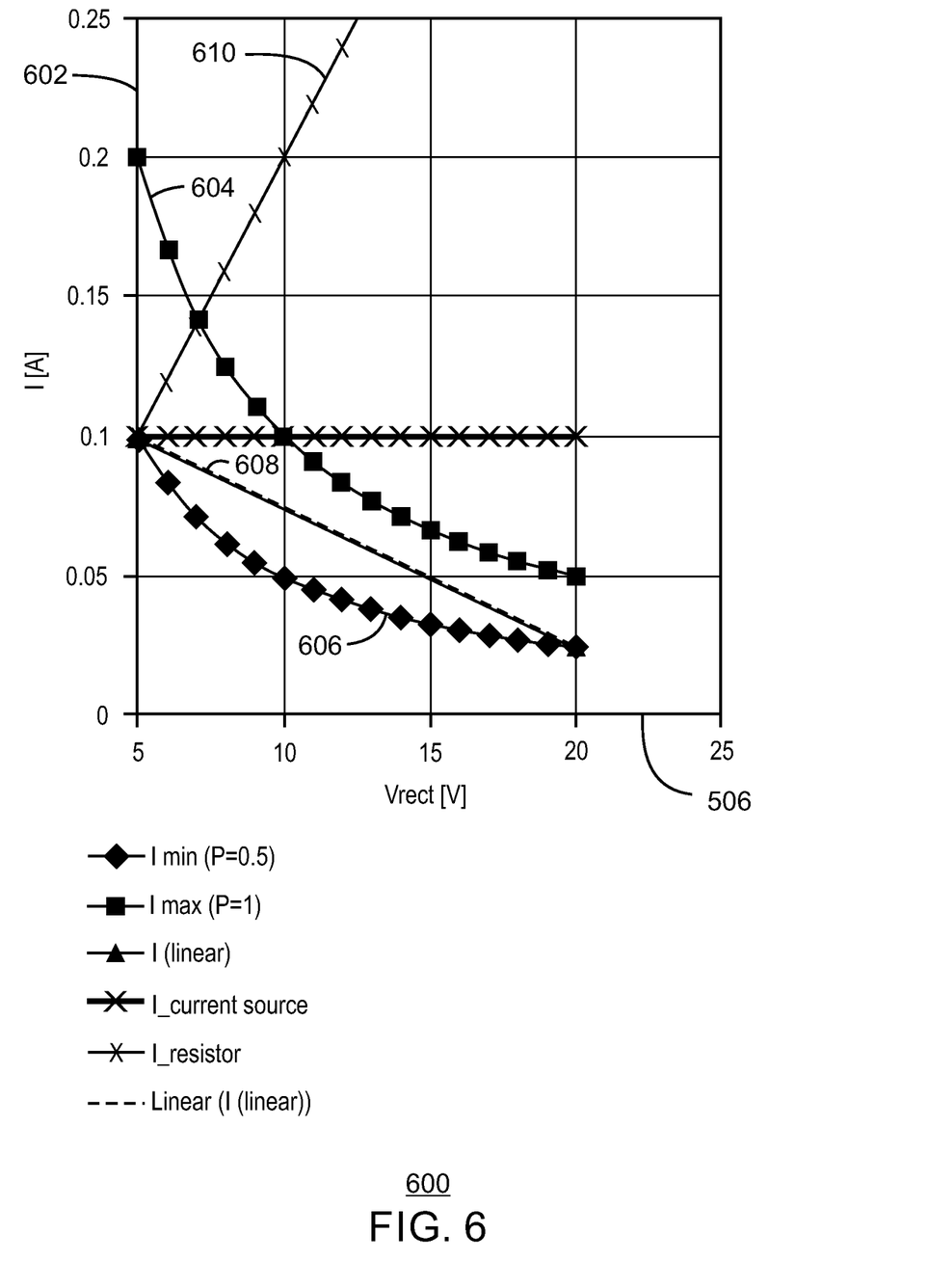
FIG. 6 is a graph illustrating changes in voltage at the rectifier in terms of current.

FIG. 6 is a graph illustrating changes in voltage at the rectifier in terms of current. As discussed above, the techniques described herein may be implemented to limit a range of rectified voltage, such as the Vrect 506 of FIG. 5, based on a supplied current, as indicated at 602. As one example, FIG. 6 illustrates limiting a range of Vrect 506 between an upper limit 604 associated with an upper limit current, and a lower limit 606 associated with a lower limit current. A resulting current 608 may be represented by Equation 4 below:

$$y = 0.005x + 0.125 \qquad \text{Eq. 3}$$

The slope of the line 608 may be adjusted to fit within any desired limit, and the techniques described herein may be implemented with a different higher limit than the 604 and a different lower limit 606. At 610, Vrect 506 is illustrated in an alternate implementation using a fixed load resistor. As illustrated at 610, the range of voltages within the limits 604 and 606 may be relatively small when compared to the line 608. Further, a digital controlled variable load resistor that may be implement by a set of fixed resistors may require additional components such as an analog to digital converter to sample Vrect, and using a digital portion of the analog to digital converter to tune a digital controlled load resistor for a specific value to meet the limits, as well as a microcontroller to implement the process. In contrast, the techniques described herein include a current source-based compensation logic, such as the current source-based compensation logic 500 of FIG. 5 that may be implemented with relative simplicity.

Figure 7:
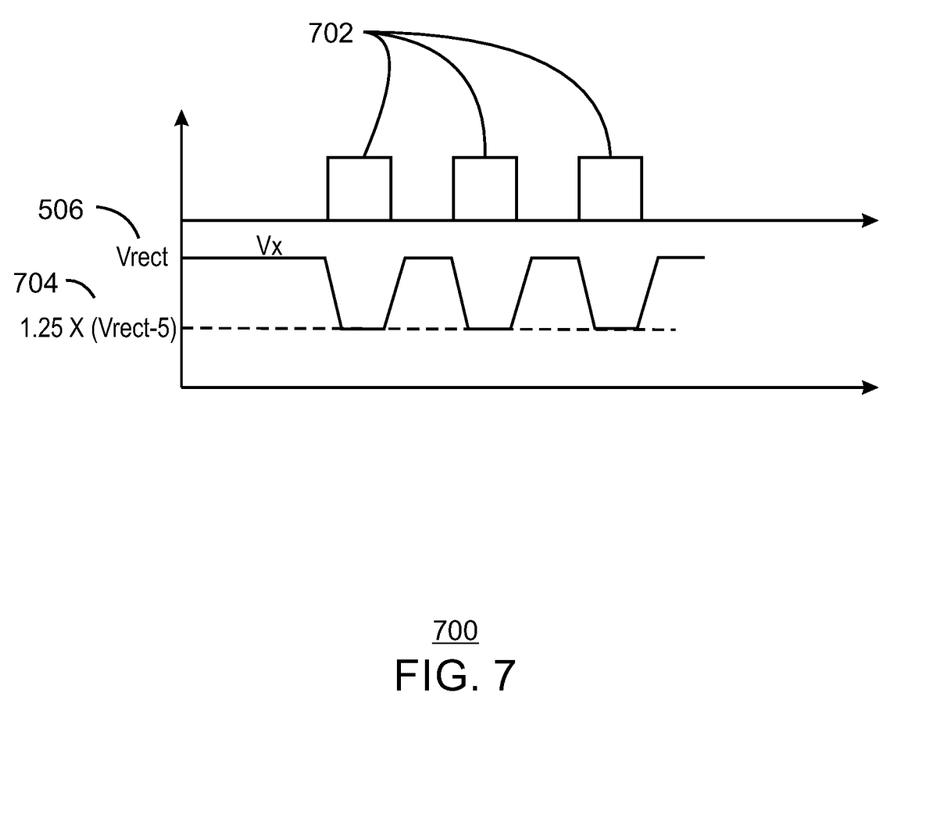
FIG. 7 is a time line illustrating changes in voltage at the rectifier in terms of current enabled by a current source.

FIG. 7 is a time line illustrating changes in voltage at the rectifier in terms of current enabled by a current source. As discussed above, the current source-based compensation logic 500 of FIG. 5 may be used to drop a voltage level of rectified voltage, such as the Vx at the external pin 514 of FIG. 5. When the second amplifier 504 of FIG. 5 is enabled at 702, the Vrect 506 will drop to the desired voltage. In this example, Vx at the external pin 514 will drop to 1.25× (Vrect- 5) as indicated at 704.

Figure 8:
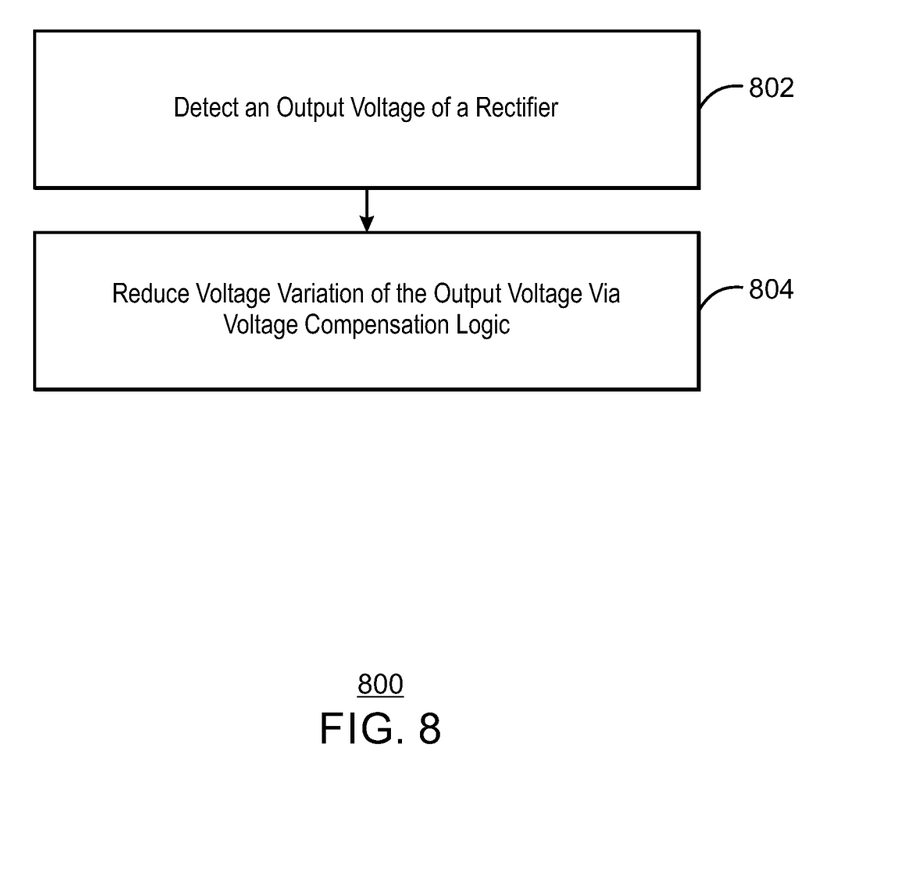
FIG. 8 is a flow diagram of a method for reducing voltage variation in a rectifier of wireless charging apparatus.

FIG. 8 is a flow diagram of a method for reducing voltage variation in a rectifier of wireless charging apparatus. At 802, the method 800 may include detecting an output voltage of a rectifier. At block 804, the method 800 may include reducing a voltage variation of the output voltage via voltage compensation logic.

In some cases, reducing voltage variation of the output voltage via voltage comprises driving a voltage controlled capacitor in parallel with a wireless power receiving coil. In some cases, wherein reducing voltage variation of the output voltage via voltage comprises initiating a current source configured to limit a voltage range of the rectifier within a predefined range. In some cases, wherein reducing voltage variation of the output voltage via voltage comprises combination of driving the voltage controlled capacitor and initiating the current source configured to limit a voltage range of the rectifier within a predefined range.

Further, in some cases limiting the voltage range generates a limit in power range at the rectifier during load modulation of the wireless power receiver. Limiting the voltage range via the current source may include generating a first voltage associated with a lower limit of the voltage range at a first amplifier, generating a second voltage associated with a higher limit of the voltage range at a voltage divider, receiving the first voltage and the second voltage at a second amplifier, and providing, from the second amplifier, an equalized output voltage within the predefined range based on the first voltage and the second voltage.

Reducing the voltage variation via voltage controlled capacitors may include detecting a difference between a reference voltage and a voltage associated with the output from the rectifier, and adjusting a bias voltage output from the difference amplifier to be provided to the voltage controlled capacitor based on the detected difference. The bias voltage output from the difference amplifier may be within a predefined continuous range, or may be at discrete levels. In the latter case, reducing voltage variation of the output voltage via voltage controlled capacitors may include detecting a difference between a reference voltage and a voltage associated with output from the rectifier, and triggering an associated value in a capacitor bank to reduce capacitance of the voltage controlled capacitor.

Further, in some cases, the voltage controlled capacitor is a first voltage controlled capacitor among a second voltage capacitor. The second voltage capacitor may be in series with the receiver coil. The method may further include configuring the first and second voltage capacitor to provide a minimum operating voltage to the rectifier.

Example 1 is an apparatus for voltage regulation in a wireless power receiver. In this example, the wireless charging device may include a rectifier comprising an output voltage, and a means for voltage compensation to reduce voltage variation of the output voltage from the rectifier.

Example 2 includes the apparatus of example 1. In this example, the means for voltage compensation may include a voltage controlled capacitor in parallel with a wireless power receiving coil.

Example 3 includes the apparatus of any combination of examples 1-2. In this example, the means for voltage compensation generates a compensated current source configured to limit a power range of the rectifier within a predefined range.

Example 4 includes the apparatus of any combination of examples 1-3. In this example limiting the power range is a function of voltage range during load modulation of the wireless power receiver.

Example 5 includes the apparatus of any combination of examples 1-4. In this example, the current source may include a first amplifier to generate a first voltage associated with a lower limit of the voltage range, a voltage divider to generate a second voltage associated with a higher limit of the voltage range, a second amplifier to: receive the first voltage and the second voltage, and supply an equalized output voltage within the predefined range based on the first voltage and the second voltage.

Example 6 includes the apparatus of any combination of examples 1-5. In this example, the voltage comparison logic may include a voltage controlled capacitor, a difference amplifier configured to: detect a difference between a reference voltage and a voltage associated with the output from the rectifier, and adjust a bias voltage output from the difference amplifier supplied to the voltage controlled capacitor based on the detected difference.

Example 7 includes the apparatus of any combination of examples 1-6. In this example, the bias voltage output from the difference amplifier is within a predefined continuous range.

Example 8 includes the apparatus of any combination of examples 1-7. In this example, the voltage controlled capacitor is a first voltage controlled capacitor. This example includes a second voltage controlled capacitor in series with the receiver coil, and wherein the first voltage controlled capacitor and the second voltage controlled capacitor are configured to supply a minimum operating voltage to the rectifier.

Example 9 includes the apparatus of any combination of examples 1-8. In this example, the voltage comparison logic may include a difference amplifier configured to: detect a difference between a reference voltage and a voltage associated with output from the rectifier, and trigger an associated value in a capacitor bank to reduce capacitance of the voltage controlled capacitor.

Example 10 includes the apparatus of any combination of examples 1-9. In this example a bias voltage output from the difference amplifier is within a predefined range of discrete voltages.

Example 11 is a method for voltage regulation in a wireless power receiver. In this example, the wireless charging device may include detecting an output voltage of a rectifier, and reducing voltage variation of the output voltage via voltage compensation logic.

Example 12 includes the method of example 11. In this example reducing voltage variation of the output voltage via voltage may include driving a voltage controlled capacitor in parallel with a wireless power receiving coil.

Example 13 includes the method of any combination of examples 11-12. This example includes limiting a power range of the rectifier within a predefined range as a function of rectified voltage.

Example 14 includes the method of any combination of examples 11-13. In this example, the power range is limited during load modulation of the wireless power receiver.

Example 15 includes the method of any combination of examples 11-14. In this example limiting the voltage range via the current source may include generating a first voltage associated with a lower limit of the voltage range at a first amplifier, generating a second voltage associated with a higher limit of the voltage range at a voltage divider, receiving the first voltage and the second voltage at a second amplifier, and providing, from the second amplifier, an equalized output voltage within the predefined range based on the first voltage and the second voltage.

Example 16 includes the method of any combination of examples 11-15. In this example reducing voltage variation of the output voltage via voltage controlled capacitors may include detecting a difference between a reference voltage and a voltage associated with the output from the rectifier, and adjusting a bias voltage output from the difference amplifier to be provided to the voltage controlled capacitor based on the detected difference.

Example 17 includes the method of any combination of examples 11-16. In this example, the bias voltage output from the difference amplifier is within a predefined continuous range.

Example 18 includes the method of any combination of examples 11-17. In this example, the voltage controlled capacitor is a first voltage controlled capacitor among a second voltage capacitor, the second voltage capacitor in series with the receiver coil, the method further comprising configuring the first and second voltage capacitor to provide a minimum operating voltage to the rectifier.

Example 19 includes the method of any combination of examples 11-18. T reducing voltage variation of the output voltage via voltage controlled capacitors may include detecting a difference between a reference voltage and a voltage associated with output from the rectifier, and triggering an associated value in a capacitor bank to reduce capacitance of the voltage controlled capacitor.

Example 20 includes the method of any combination of examples 11-19. In this example a bias voltage output from the difference amplifier is within a predefined range of discrete voltages.

Example 21 is a system for wireless charging. In this example, the wireless charging device may include a rectifier comprising an output voltage, and voltage compensation logic to reduce voltage variation of the output voltage from the rectifier.

Example 22 includes the system of example 21. In this example, the means for voltage compensation may include a voltage controlled capacitor in parallel with a wireless power receiving coil.

Example 23 includes the system of any combination of examples 21-22. In this example, the means for voltage compensation generates a compensated current source configured to limit a power range of the rectifier within a predefined range.

Example 24 includes the system of any combination of examples 21-23. In this example limiting the power range is a function of voltage range during load modulation of the wireless power receiver.

Example 25 includes the system of any combination of examples 21-24. In this example, the current source may include a first amplifier to generate a first voltage associated with a lower limit of the voltage range, a voltage divider to generate a second voltage associated with a higher limit of the voltage range, a second amplifier to: receive the first voltage and the second voltage, and supply an equalized output voltage within the predefined range based on the first voltage and the second voltage.

Example 26 includes the system of any combination of examples 21-25. In this example, the voltage comparison logic may include a voltage controlled capacitor, a difference amplifier configured to: detect a difference between a reference voltage and a voltage associated with the output from the rectifier, and adjust a bias voltage output from the difference amplifier supplied to the voltage controlled capacitor based on the detected difference.

Example 27 includes the system of any combination of examples 21-26. In this example, the bias voltage output from the difference amplifier is within a predefined continuous range.

Example 28 includes the system of any combination of examples 21-27. In this example, the voltage controlled capacitor is a first voltage controlled capacitor. This example includes a second voltage controlled capacitor in series with the receiver coil, and wherein the first voltage controlled capacitor and the second voltage controlled capacitor are configured to supply a minimum operating voltage to the rectifier.

Example 29 includes the system of any combination of examples 21-28. In this example, the voltage comparison logic may include a difference amplifier configured to: detect a difference between a reference voltage and a voltage associated with output from the rectifier, and trigger an associated value in a capacitor bank to reduce capacitance of the voltage controlled capacitor.

Example 30 includes the system of any combination of examples 21-29. In this example a bias voltage output from the difference amplifier is within a predefined range of discrete voltages.

Example 31 is an apparatus for voltage regulation in a wireless power receiver. In this example, the wireless charging device may include a rectifier comprising an output voltage, and a means for voltage compensation to reduce voltage variation of the output voltage from the rectifier.

Example 32 includes the apparatus of example 31. In this example, the means for voltage compensation may include a voltage controlled capacitor in parallel with a wireless power receiving coil.

Example 33 includes the apparatus of any combination of examples 31-32. In this example, the means for voltage compensation generates a compensated current source configured to limit a power range of the rectifier within a predefined range.

Example 34 includes the apparatus of any combination of examples 31-33. In this example limiting the power range is a function of voltage range during load modulation of the wireless power receiver.

Example 35 includes the apparatus of any combination of examples 31-34. In this example, the current source may include a first amplifier to generate a first voltage associated with a lower limit of the voltage range, a voltage divider to generate a second voltage associated with a higher limit of the voltage range, a second amplifier to: receive the first voltage and the second voltage, and supply an equalized output voltage within the predefined range based on the first voltage and the second voltage.

Example 36 includes the apparatus of any combination of examples 31-35. In this example, the voltage comparison logic may include a voltage controlled capacitor, a difference amplifier configured to: detect a difference between a reference voltage and a voltage associated with the output from the rectifier, and adjust a bias voltage output from the difference amplifier supplied to the voltage controlled capacitor based on the detected difference.

Example 37 includes the apparatus of any combination of examples 31-36. In this example, the bias voltage output from the difference amplifier is within a predefined continuous range.

Example 38 includes the apparatus of any combination of examples 31-37. In this example, the voltage controlled capacitor is a first voltage controlled capacitor. This example includes a second voltage controlled capacitor in series with the receiver coil, and wherein the first voltage controlled capacitor and the second voltage controlled capacitor are configured to supply a minimum operating voltage to the rectifier.

Example 39 includes the apparatus of any combination of examples 31-38. In this example, the voltage comparison logic may include a difference amplifier configured to: detect a difference between a reference voltage and a voltage associated with output from the rectifier, and trigger an associated value in a capacitor bank to reduce capacitance of the voltage controlled capacitor.

Example 40 includes the apparatus of any combination of examples 31-39. In this example a bias voltage output from the difference amplifier is within a predefined range of discrete voltages.

Example 41 is a method for voltage regulation in a wireless power receiver. In this example, the wireless charging device may include detecting an output voltage of a rectifier, and reducing voltage variation of the output voltage via voltage compensation logic.

Example 42 includes the method of example 41. In this example reducing voltage variation of the output voltage via voltage may include driving a voltage controlled capacitor in parallel with a wireless power receiving coil.

Example 43 includes the method of any combination of examples 41-42. This example includes limiting a power range of the rectifier within a predefined range as a function of rectified voltage.

Example 44 includes the method of any combination of examples 41-43. In this example, the power range is limited during load modulation of the wireless power receiver.

Example 45 includes the method of any combination of examples 41-44. In this example limiting the voltage range via the current source may include generating a first voltage associated with a lower limit of the voltage range at a first amplifier, generating a second voltage associated with a higher limit of the voltage range at a voltage divider, receiving the first voltage and the second voltage at a second amplifier, and providing, from the second amplifier, an equalized output voltage within the predefined range based on the first voltage and the second voltage.

Example 46 includes the method of any combination of examples 41-45. In this example reducing voltage variation of the output voltage via voltage controlled capacitors may include detecting a difference between a reference voltage and a voltage associated with the output from the rectifier, and adjusting a bias voltage output from the difference amplifier to be provided to the voltage controlled capacitor based on the detected difference.

Example 47 includes the method of any combination of examples 41-46. In this example, the bias voltage output from the difference amplifier is within a predefined continuous range.

Example 48 includes the method of any combination of examples 41-47. In this example, the voltage controlled capacitor is a first voltage controlled capacitor among a second voltage capacitor, the second voltage capacitor in series with the receiver coil, the method further comprising configuring the first and second voltage capacitor to provide a minimum operating voltage to the rectifier.

Example 49 includes the method of any combination of examples 41-48. T reducing voltage variation of the output voltage via voltage controlled capacitors may include detecting a difference between a reference voltage and a voltage associated with output from the rectifier, and triggering an associated value in a capacitor bank to reduce capacitance of the voltage controlled capacitor.

Example 50 includes the method of any combination of examples 41-49. In this example a bias voltage output from the difference amplifier is within a predefined range of discrete voltages.

Not all components, features, structures, characteristics, etc. described and illustrated herein need be included in a particular aspect or aspects. If the specification states a component, feature, structure, or characteristic "may", "might", "can" or "could" be included, for example, that particular component, feature, structure, or characteristic is not required to be included. If the specification or claim refers to "a" or "an" element, that does not mean there is only one of the element. If the specification or claims refer to "an additional" element, that does not preclude there being more than one of the additional element.

It is to be noted that, although some aspects have been described in reference to particular implementations, other implementations are possible according to some aspects. Additionally, the arrangement and/or order of circuit elements or other features illustrated in the drawings and/or described herein need not be arranged in the particular way illustrated and described. Many other arrangements are possible according to some aspects.

In each system shown in a figure, the elements in some cases may each have a same reference number or a different reference number to suggest that the elements represented could be different and/or similar. However, an element may be flexible enough to have different implementations and work with some or all of the systems shown or described herein. The various elements shown in the figures may be the same or different. Which one is referred to as a first element and which is called a second element is arbitrary.

It is to be understood that specifics in the aforementioned examples may be used anywhere in one or more aspects. For instance, all optional features of the computing device described above may also be implemented with respect to either of the methods or the computer-readable medium described herein. Furthermore, although flow diagrams and/or state diagrams may have been used herein to describe aspects, the techniques are not limited to those diagrams or to corresponding descriptions herein. For example, flow need not move through each illustrated box or state or in exactly the same order as illustrated and described herein.

The present techniques are not restricted to the particular details listed herein. Indeed, those skilled in the art having the benefit of this disclosure will appreciate that many other variations from the foregoing description and drawings may be made within the scope of the present techniques. Accordingly, it is the following claims including any amendments thereto that define the scope of the present techniques.

What is claimed is:

1. An apparatus for voltage regulation in a wireless power receiver, comprising:
    a rectifier coupled to a wireless power receiving coil to rectify a voltage received from the wireless power receiving coil; and
    a voltage compensation logic to reduce voltage variation of an output voltage of the rectifier, the voltage compensation logic comprising:
        a voltage controlled capacitor parallel to the wireless power receiving coil;
        a voltage divider coupled to an output of the rectifier to generate a voltage signal proportional to the output voltage of the rectifier; and
        a difference amplifier to detect a difference between a reference voltage and the voltage signal and output a bias voltage, wherein the bias voltage adjusts a capacitance of the voltage controlled capacitor.

2. The apparatus of claim 1, wherein the voltage compensation logic is configured to generate a compensated current source, wherein the compensated current source is configured to limit a power range of the rectifier within a predefined range.

3. The apparatus of claim 2, wherein the compensated current source is configured to limit the power range of the rectifier with a function of voltage range during load modulation of the wireless power receiver.

4. The apparatus of claim 2, wherein the current source comprises:
    a first amplifier to generate a first voltage of a lower limit of the voltage range;
    a voltage divider to generate a second voltage of a higher limit of the voltage range;
    a second amplifier to:
        receive the first voltage and the second voltage; and
        supply an equalized output voltage within the predefined range based on the first voltage and the second voltage.

5. The apparatus of claim 1, wherein the bias voltage output from the difference amplifier is within a predefined continuous range.

6. The apparatus of claim 1, wherein the voltage controlled capacitor is a first voltage controlled capacitor,
    wherein the voltage compensation logic further comprises a second voltage controlled capacitor arranged in series with the wireless power receiving coil, and
    wherein the first voltage controlled capacitor and the second voltage controlled capacitor are configured to supply a minimum operating voltage to the rectifier.

7. The apparatus of claim 1, wherein the voltage compensation logic comprises a difference amplifier configured to trigger an associated value in a capacitor bank to reduce capacitance of the voltage controlled capacitor based on the difference between the reference voltage and the voltage signal detected by the difference amplifier.

8. The apparatus of claim 1, wherein the bias voltage output from the difference amplifier is within a predefined range of discrete voltages.

9. A method for voltage regulation in a wireless power receiver, comprising:
rectifying a voltage received from a wireless power receiving coil via a rectifier coupled to the wireless power receiving coil;
generating a voltage signal proportional to an output voltage of the rectifier;
detecting a difference between a reference voltage and the voltage signal;
outputting a bias voltage; and
adjusting a capacitance of a voltage controlled capacitor based on the bias voltage so that a voltage variation of the output voltage of the rectifier is reduced, wherein the voltage controlled capacitor is parallel to the wireless power receiving coil.

10. The method of claim 9, wherein reducing the voltage variation of the output voltage of the rectifier comprises driving a voltage controlled capacitor in parallel with the wireless power receiving coil.

11. The method of claim 9, further comprising limiting a power range of the rectifier within a predefined range as a function of rectified voltage.

12. The method of claim 11, further comprising limiting the power range during load modulation of the wireless power receiver.

13. The method of claim 11, wherein limiting a voltage range of the rectifier via a current source comprises:
generating a first voltage associated with a lower limit of the voltage range at a first amplifier;
generating a second voltage of a higher limit of the voltage range at a voltage divider;
receiving the first voltage and the second voltage at a second amplifier; and
providing, from the second amplifier, an equalized output voltage within the predefined range based on the first voltage and the second voltage.

14. The method of claim 9, wherein reducing voltage variation of the output voltage via the voltage controlled capacitor comprises:
detecting a difference between a reference voltage and the output voltage of the rectifier; and
adjusting a bias voltage output from the difference amplifier to be provided to the voltage controlled capacitor based on the detected difference.

15. The method of claim 14, wherein the bias voltage output from the difference amplifier is within a predefined continuous range.

16. The method of claim 14, wherein the voltage controlled capacitor is a first voltage controlled capacitor among a second voltage controlled capacitor, the second voltage controlled capacitor in series with the receiver coil, the method further comprising configuring the first and second voltage controlled capacitors to provide a minimum operating voltage to the rectifier.

17. The method of claim 14, wherein reducing voltage variation of the output voltage via the voltage controlled capacitor comprises:
detecting a difference between a reference voltage and the voltage signal; and
triggering an associated value in a capacitor bank to reduce capacitance of the voltage controlled capacitor.

18. The method of claim 17, wherein the bias voltage output from the difference amplifier is within a predefined range of discrete voltages.

19. A system for wireless charging, comprising:
a rectifier comprising an output voltage; and
a voltage compensation logic to reduce voltage variation of the output voltage from the rectifier, wherein the voltage compensation logic comprises:
a voltage controlled capacitor in parallel with a wireless power receiving coil;
a current source configured to limit a voltage range of the rectifier within a predefined range; or
a combination thereof.

20. The system of claim 19, wherein the current source is configured to generate a limit in power range at the rectifier during load modulation of the wireless power receiver.

21. The system of claim 19, wherein the current source comprises:
a first amplifier to generate a first voltage associated with a lower limit of the voltage range;
a voltage divider to generate a second voltage of a higher limit of the voltage range;
a second amplifier to:
receive the first voltage and the second voltage; and
provide an equalized output voltage within the predefined range based on the first voltage and the second voltage.

22. The system of claim 19, wherein the voltage compensation logic further comprises a difference amplifier configured to:
detect a difference between a reference voltage and a voltage associated with the output from the rectifier; and
adjust a bias voltage output from the difference amplifier to be provided to the voltage controlled capacitor based on the detected difference.

23. The system of claim 19, wherein the capacitor is a first voltage controlled capacitor, further comprising
a second voltage controlled capacitor arranged in series with the receiver coil, and
wherein the first voltage controlled capacitor and the second voltage controlled capacitor are configured to provide a minimum operating voltage to the rectifier.

* * * * *